Dec. 8, 1942.    D. GREGG    2,304,686
SYSTEM OF ICE REMOVAL
Filed Oct. 15, 1940
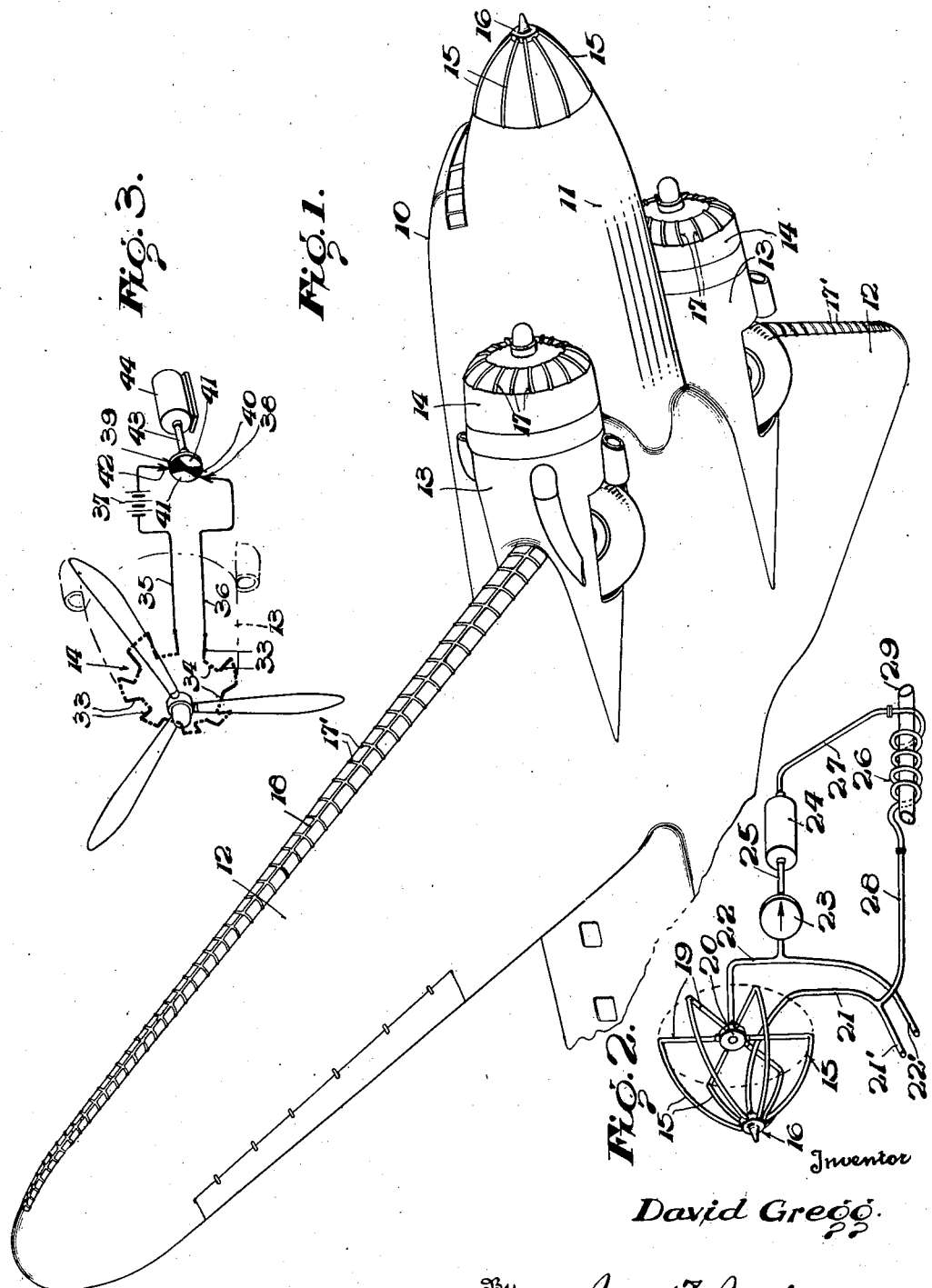
Inventor
David Gregg.
By David F. Doody
Attorney Patented Dec. 8, 1942

2,304,686

UNITED STATES PATENT OFFICE 2,304,686

SYSTEM OF ICE REMOVAL

David Gregg, Caldwell, N. J., assignor to Bendix Aviation Corporation, South Bend, Ind., a corporation of Delaware Application October 15, 1940, Serial No. 361,323

3 Claims. (Cl. 244—134)

This invention relates to anti-icing systems and particularly to a system applicable to large or bulbous leading portions of aircraft.

One of the objects of the present invention is the provision of means for breaking an ice formation into unsupported segments which may be blown away by the slip-stream of an aircraft.

Another object lies in the provision of an anti-icing system which utilizes heat and certain structural members to divide an ice surface into unsupported segments which may be blown away by the slipstream of an aircraft.

Other objects will appear from a study of the following specification when made in conjunction with the attached drawing, throughout which like numerals designate like parts in the several figures:

Fig. 1 is a view in perspective of a portion of an aircraft, showing the de-icing ribs utilized in the present invention;

Fig. 2 is a showing, principally schematic, of one form of the de-icing system applied to the nose of an aircraft fuselage; and Fig. 3 is a schematic showing of another embodiment of the de-icing system of the present invention.

In accordance with the system of the present invention, heated ribs may be so located upon the nose and other large, bulbous leading portions of an aircraft that a continuous ice surface may, by the action of the heat, be melted into separate, unsupported segments which may then be carried away by the air-stream. These ribs may be heated by air, a liquid, such as water or oil, or by electrical resistances. A suitable distributing means may be provided for de-icing different portions of the aircraft body in sequence.

As shown in Fig. 1, 10 is an aircraft having a bulbous nose portion 11, wing portions 12, and engine nacelles 13, surrounded by cowling members 14. Nose portion 11, the skin of which is formed into substantially a bluntly rounded surface of revolution, carries radially disposed hollow ribs 15, connected to a centrally disposed hub member 16. Cowling members 14 are formed with curved hollow ribs 17 on the leading portions thereof. Curved hollow ribs 17', in communication with transversely extending ribs 18, are carried by the leading edges of wings 12. Rib members 15, 17, 17' and 18 may be formed of aluminum and may be integral, or riveted, or otherwise secured, to nose portion 11, cowling members 14 and wings 12.

One embodiment of the present invention is shown more fully in Fig. 2, in which hollow ribs 15 are shown connected by conduits 19 to a central manifold 20. An inlet conduit 21 is connected to hub member 16, and outlet conduit 22 is connected to manifold 20 and to the input of pump 23. In series with pump 23 is a reservoir 24 for air, oil, water, or any other desired fluid. Pump 23 communicates with reservoir 24 through a conduit 25. Also, in circuit with the above-mentioned members, there is a coiled heating member 26 connected by means of suitable piping 27 to reservoir 24 and by piping 28 to inlet conduit 21.

Coiled heating element 26 may be disposed about the exhaust stack 29 of the aircraft engine in such a manner as to absorb heat therefrom. Member 26 may be surrounded, if it is so desired, with a heat insulating material, not shown, in order that the maximum amount of heat may be transferred from the exhaust stack to ribs 15. Branch inlet and outlet conduits, such as 21' and 22' may be connected in parallel with conduits 21 and 22, respectively, so that other surfaces, such as the wings, stabilizer, etc., may be de-iced simultaneously with nose portion 11.

While heated fluid is passed through ribs 15, due to circulation maintained by pump 23, any ice formation, upon or close to ribs 15, will be melted, and as the ribs are placed sufficiently close together so that heat from adjacent ribs will act to break the adhesion of the ice between the ribs, the different segments of ice formed by the action of the hot ribs will be easily blown from the aircraft's body by the air-stream.

It will be apparent from this description of the embodiment shown in Fig. 2 that heated fluid may be circulated through ribs 17' and 18 in the same manner. While the actual connections of these ribs to the heating and circulating system of Fig. 2 are not shown, it will be apparent that one end, for example, the end nearest nacelle 13, may be connected to inlet conduit 21', and the outer or wing tip end of rib 18 may be connected by a conduit returning through the interior of wing 12 to outlet conduit 22'. Ribs 17' are closed at their upper and lower ends, and are all connected in parallel to rib 18 at the mid-point of ribs 17. When these ribs are connected in the circuit of Fig. 2, as above stated, complete circulation of heated fluid through ribs 17' and 18 will be effected. The installation in each type of airplane, the length of rib 18, etc., will determine the optimum pressure at which the heated fluid should be circulated. This can be readily determined for each installation.

Fig. 3 represents a means for de-icing the cowling 14 of an engine nacelle by means of an electrical circuit, which will now be described. Ribs 17 (shown in Fig. 1) contain the electrical resistance elements 33 which are joined together at opposite ends by means of conductors 34 (shown dotted), forming a continuous series circuit between conductors 35 and 36. Conductor 35 is connected to a battery 37, while conductor 36 is connected to a brush member 38 which bears against a rotating commutator 39, having a conductive portion 40 and two insulating sectors 41. The battery 37 is also connected to commutator 39 by means of a brush member 42. Commutator 39 is carried upon shaft 43 of motor 44, and commutator 39 may be so designed that the electric circuit across battery 37 is maintained closed for substantially 90 degrees through conductive portion 40. The amount of time necessary for de-icing may be determined by experience, and motor 44 may be geared to rotate commutator 39 at a speed suitable to allow complete de-icing. It is apparent that while the electrical circuit is closed through brushes 38 and 42, heat will be generated in resistance elements 33 and radiated through ribs 17 to melt the snow along the ribs and thus divide the ice formed upon cowling 14 into separate, unsupported segments which will be then blown away by the air-stream. If it is desired to de-ice more than one nacelle, or other leading portions, any number of additional circuits, similar electrically to that shown, may be connected to battery 37 and commutator 39. It is believed unnecessary to show such additional circuits in Fig. 3.

The fluid utilized in the system described in Fig. 2, may be engine oil, in which case it is unnecessary to heat the oil by means of coiled member 26 and exhaust stack 29, since it will be sufficiently heated by operation of the engine. The de-icing system of the present invention may be applied to any of the usual leading surfaces of an aircraft, such as the propeller hub spinners, and navigation lights, as well as the wings, nose, or the engine nacelles, as shown.

It has been found that with the present system, a comparatively small amount of heat will satisfactorily melt ice along the ribs 15, 17, 17' and 18 and cause the adhesiveness of the ice to the aluminum surface of the craft to be considerably lessened, so that once the ice has been melted along ribs 15, 17, 17' and 18, the smaller areas of ice thus formed are readily whipped from the body of the aircraft by the force of the air-stream.

While only two embodiments of the present invention have been shown in the drawing, it is to be understood that various changes may be made without departing from the scope of the present invention. For this reason, it is intended not to limit the invention by the description herein given as an example, but solely by the scope of the appended claims.

What is claimed is:

1. In combination with an aircraft having a leading surface substantially a surface of revolution, anti-icing means secured to said leading surface and including a raised tubular imperforate rib extending along a line similar to a directrix of said surface, and means for circulating a heated fluid within said tubular rib, whereby upon the formation of ice upon said surface, the circulation of heat in said rib will cause the ice to be divided into segments.

2. In combination with a leading surface of an aircraft, said surface being substantially one of revolution, a plurality of imperforate tubular ribs upstanding on said surface, and means for circulating hot fluid in said ribs, whereby upon the heating of said ribs by hot fluid, an ice surface may be broken into separate surfaces unsupported along their adjacent edges.

3. In combination with a leading surface of an aircraft, upstanding imperforate ribs extending radially of a central portion of said surface, and means to heat said ribs, whereby ice formation on said surface may be divided into separate segments bounded by said upstanding ribs.

4. In combination with a leading surface of an aircraft, upstanding imperforate rib members extending along said surface, and means to heat said rib members, whereby ice formation on said surface may be divided into separate segments bounded by said upstanding rib members.

5. In combination with a leading surface of an aircraft, an imperforate rib member fixed thereto, one end of said member being forward of the other end of said member, and means for heating said rib member, whereby an ice formation on said surface may be melted into separate segments along said rib member.

6. A de-icing system for aircraft having a leading surface substantially a surface of revolution, which includes a plurality of imperforate rib members for attachment to said surface, an electrical resistance element within each of said ribs, a source of electrical energy, and means for intermittently energizing said resistance for heating said ribs.

7. In combination with a leading surface of an aircraft, an imperforate rib member upstanding thereon, a resistance element within said rib member, a source of electrical energy, connections between said resistance element and said source, and means for alternately connecting said resistance to and disconnecting said resistance from said source of electrical energy.

8. In combination with a leading surface of an aircraft, an upstanding, imperforate rib member thereon, an electrical resistance element within said rib member, a source of electrical energy, and connections between said resistance element and said source, whereby heat from said resistance element may be transferred to said rib member.

DAVID GREGG.